United States Patent Office 3,357,851
Patented Dec. 12, 1967

3,357,851
HEAVY CONCRETE PIPE COATING COMPOSITION AND METHOD
Joseph B. Montgomery III, Birchrunville, Pa., assignor of fifty percent to Richard M. Colgate, Princeton, N.J.
No Drawing. Filed July 20, 1966, Ser. No. 566,488
7 Claims. (Cl. 117—70)

ABSTRACT OF THE DISCLOSURE

A heavy concrete for coating a pipe which is to be submerged in a fluid, the heavy concrete constituting ballast and reducing the buoyancy of the pipe and being coated onto the pipe by moving the pipe sections longitudinally and rotationally through the concrete slurry. The heavy concrete consists essentially of Portland cement and specular hematite as the aggregate, the cement to aggregate ratio in the range of, by weight, from about 1:3 to about 1:4. The aggregate has a size distribution in which, by weight, at least 90% passes a #8 mesh screen and not more than 10% passes a #100 mesh screen, and is substantially free of microfines passing a #200 mesh screen.

---

This invention relates to a novel and improved heavy concrete composition of the type used as a ballast for pipe which is to be laid under water or in a marsh or swamp, the concrete being coated onto the pipe for the purpose of increasing its overall specific gravity and to overcome its buoyancy; the invention further relates to an improved coating method employing the composition.

In the construction of underwater pipe lines, or pipe lines which run through a marsh, swamp or delta area, it is usually necessary to increase the overall specific gravity of the pipe so that it is not buoyant and will stay in place under the water. The early practice was to simply chain metal or concrete weights to the pipe at intervals in order to hold it down. More recently, this technique has been supplanted by coating the exterior surface of the entire pipe with a heavy material, usually a heavy concrete composition.

A basic requirement, of course, for all heavy pipe coating concrete is that it have a high density, usually significantly higher than normal concrete. The higher density must be obtained solely by using an aggregate having a high specific gravity, the specific gravity of the cement being substantially a constant. In addition to having a high specific gravity, the heavy concrete must also contain minimal quantities of chemicals which are detrimental to the strength and endurance of the concrete and to the life of the pipe. It must also have sufficient strength to sustain the stresses imposed on it during transport, installation, and use.

The principal method of applying the heavy concrete coating to pipe is by impacting a continuous stream of a concrete slurry onto the pipe, the pipe being rotated about its axis and moved longitudinally through the stream. The rate of rotation and longitudinal movement of the pipe and the rate of delivery of the slurry stream determine the thickness of the coating. The manner in which the coating is applied to the pipe imposes a further requirement on the concrete composition, the ability of being impacted onto the pipe and sticking to it. At present, only one heavy aggregate has been widely used commercially as a heavy concrete coating for pipe, an ilmenite ore extracted from the product of a single mine in the Western United States.

In the continuous slurry stream impaction coating technique, it has been found that the aggregate must have a closely controlled size distribution in order to be successfully applied to the pipe without excessive fall off at the point of impact and in order to yield an adequate strength (generally not less than 3,000 p.s.i. compressive strength). The properties and a screen analysis of an exemplary ilmenite aggregate for pipe coating concrete are as follows:

Table I

Screen size:
| | |
|---|---|
| ¼" | cumulative percent retained 0.0 |
| #4 | do 31.0 |
| #8 | do 53.5 |
| #16 | do 78.8 |
| #30 | do 85.9 |
| #50 | do 96.3 |
| #100 | do 100.0 |
| Pan | do 100.0 |
| Specific gravity | 4.5 |
| Loose rodded bulk density | # per cu. ft. 175 |
| Fineness modulus | 2.70–3.85 |

The two most important criteria in selecting the aggregate for use in the process, as exemplified in the above specifications for an ilmenite aggregate, are (1) that it contain a substantial amount (about 50% by weight, generally) of particles in the #8 mesh to ¼ inch range and (2) that it be substantially free of particles passing a 100 mesh screen. Previous attempts to use heavy aggregates not meeting the above described size specifications have been unsuccessful, the coating falling off upon impact on the pipe, the strength being below specifications, or both.

There is provided, in accordance with the invention, a novel and improved heavy concrete which incorporates, as an aggregate, a specular hematite having a size distribution in which, by weight, at least 90% passes a #8 mesh screen and not more than 10% passes a #100 mesh screen. Moreover, it is important that the aggregate be substantially free of micro-fines, that is, particles passing a #200 mesh screen. The specular hematite preferably has a size distribution which is within the following ranges by weight:

Table II

| Screen size: | Cumulative percent retained |
|---|---|
| #8 | 0 to 10 |
| #14 | 10 to 15 |
| #20 | 20 to 30 |
| #28 | 35 to 50 |
| #35 | 55 to 65 |
| #48 | 70 to 80 |
| #65 | 80 to 98 |
| #100 | 90 to 100 |

A number of experimental runs have been made using a specular hematite taken from a mine at Lac Jeannine, Quebec, Canada, operated by Quebec-Cartier Mining Co. The Lac Jeannine deposit yields a product having particularly advantageous properties for use as a heavy aggregate. The properties are apparently partly a result of the mineralogical characteristics of the Lac Jeannine deposit and partly a result of the beneficiation techniques used at the mine. As used here, "Lac Jeannine specular hematite" is intended to refer to the product of the deposit at Lac Jeannine, Quebec and other specular hematites having substantially the same physical and mechanical properties.

The Lac Jeannine deposit consists of coarse-grained specular hematite, resulting from intense metamorphism of the original iron oxides, in a matrix of sugary quartz and it thus can be ground and separated relatively simply. The ore is taken from the pit and delivered by truck to a primary and secondary crushing plant where twin lines of wobbler feeders, 84" x 66" jaw crushers and 30" x 70" secondary gyratory crushers produce a minus 12-inch product. This product is fed to 18' x 5' Cascade type antogenous grinding mills, which include closed circuit screening and recycling apparatus, to grind to a minus 10 mesh. The minus 10 mesh grind is sufficient to liberate the specular hematite from the quartz matrix for concentration in spiral and cyclone separators.

The Lac Jeannine specular hematite has the following properties:

Table III

[Type of ore: specular hematite ($Fe_2O_3$)]

Chemical Analysis:    Percent by weight Dried (100° C.)
Fe --------------------------------- 64.20
Phos. ------------------------------- .025
$SiO_2$ ----------------------------- 5.00
Mn --------------------------------- .03
$Al_2O_3$ --------------------------- .75
S ---------------------------------- .006

Typical Screen Test:

| Screen Size | Percent Retained | |
|---|---|---|
| | Individual | Cumulative |
| +#8 | 0.1 | 0.1 |
| #10 | 3.1 | 3.2 |
| #14 | 8.9 | 12.1 |
| #20 | 13.2 | 25.3 |
| #28 | 17.7 | 43.1 |
| #35 | 17.7 | 60.7 |
| #48 | 14.3 | 75.0 |
| #65 | 11.1 | 86.1 |
| #100 | 7.8 | 93.9 |
| #150 | 3.6 | 97.5 |
| #200 | 1.7 | 99.2 |
| -#200 | 0.8 | 100.0 |

Specific Gravity, 4.9.
Loose Rodded Bulk Density, 185# per. cu. ft.
Fineness Modulus, 2.33.

The test runs have been made using conventional equipment at various commercial pipe-coating installations. In all cases, Lac Jeannine specular hematite having the properties specified above and which was supplied by the Quebec-Cartier Mining Co. was used as the aggregate. In one series of tests the coating machine consisted of elevated storage bins for the cement (No. 1 Portland cement was used) and the aggregate, each of which had a metering device at the bottom for discharging controlled amounts of cement and aggregate onto a conveyor belt. Water in the required amount was added to the cement-aggregate mixture on the conveyor belt and the resulting slurry was delivered on the belt to an impactor which consisted of a pair of cooperating, high-speed wire bristle brushes mounted one over the other. The slurry was picked up by the impactor and impacted against the surface of a rotating joint of pipe. As the pipe rotated, it was also moved longitudinally on dollies riding along tracks in a direction perpendicular to the stream of concrete coming from the impactor brushes.

The concrete adhered to the surface of the pipe to a thickness which was dependent upon the rate of movement of the pipe past the impact point and the rate of rotation of the pipe. A certain amount of falloff, though no more than normal, occurred at the impact point, and the material falling off the pipe was reclaimed and reintroduced into the system on the conveyor. Immediately after the slurry was coated onto the pipe, a wire reinforcement screen was wrapped helically around the concrete coating to assist in retaining it during setting and as reinforcement. After coating, each joint of pipe was lifted by a crane from the transport dollies and removed for curing.

EXAMPLE I

In one test run on the above-described machine, an 18 inch diameter steel pipe was coated to thickness of 2½ inches. The mix in this test was, by weight, three parts of Lac Jeannine specular hematite to one part No. 1 Portland cement. As is the conventional practice in the art, the amount of water was not measured precisely, but was added in accordance with trial and error determinations. If too little water is added to the mix, the coating will fall off to a considerable extent and will appear to be spongy and unpacked. On the other hand, if too much water is used, the coating becomes sloppy and also falls off. Those skilled in the art are able to judge the proper amount of water after only a relatively short trial run.

EXAMPLE II

In another test, which was carried out using slightly different equipment, a 22 inch diameter steel pipe was coated to a thickness of 3 inches. The mix again was, by weight, three parts specular hematite to one part cement. Experiments were also conducted on this equipment with a 4 to 1 mix, and it was found to work satisfactorily, though a 3 to 1 mix appeared to be preferable. The only important difference between the coating equipment used in the second test and the one used in the first test was that a pair of belt conveyors spaced-apart approximately one inch and traveling at high velocity were used to project the cement slurry at a high velocity against the surface of the pipe.

EXAMPLE III

In another test, equipment which was substantially the same as in the first test, except that the impactor consisted of a belt and a brush, was used to apply a 3 to 1 mix to a 30 inch pipe to a thickness of 3 inches.

All of the above-described tests were highly successful and resulted in a very satisfactory coating on the pipe. The coating characteristics, particularly the tendency for fall-off to occur at the impact point, were more than acceptable. In addition, strength tests carried out on the concrete resulted in average compressive strengths (7 days) of 5700 p.s.i. with the 3 to 1 mix and 4600 p.s.i. with the 4 to 1 mix, strengths which are well above the usual specified minimum of 3000 p.s.i. The weight of the concrete coating applied in the experimental runs averaged about 195 lb., which is significantly higher than the 190 lb. minimum specification for heavy concrete usually used by the pipe coating industry.

EXAMPLE IV

Another test was carried out with the same equipment as in Example II but using a different concrete composition of lower specific gravity. A 30-inch diameter steel pipe was coated with a composition consisting of, by weight, 1½ parts specular hematite, 1½ parts sand and 1 part cement. The coating was to a thickness of 3 inches and resulted in the lighter-weight type of coating which is in the 165 lb. classification of the industry. The sand used in the test contained a quantity of relatively coarse particles in the ¼" to ⅛" sizes. Again, the coating characteristics were excellent, and the concrete met all the specifications.

EXAMPLE V

In a fifth series of runs, again with the equipment described in Example II, an 8-inch diameter steel pipe, which had previously been coated with a 30 to 60 mil thickness of high density polyethylene, was coated to a thickness of 2½" with a 3 to 1 mix, by weight, of specular hematite to cement. It was found that the coating composition of the invention provided a particularly advantages result with the plastic-coated pipe. In this regard, prior heavy concrete mixes, which have contained, by necessity, coarse particles within the range between #8 mesh and ¼" have, in the impacting coating technique, resulted in scaring and rupturing of the plastic coating. In general, the plastic coating is provided as protection for the pipe, and therefore the injury to the plastic coating by a conventional heavy concrete mix made conventional mixes unsatisfactory.

With the mix of the invention, which is free of coarse particles, no tendency to damage the plastic coating on the pipe was observed. As in the other experimental runs, the coating procedure went smoothly, with a minimum of fall-off, and produced an excellent product.

As used in the claims "Lac Jeannine specular hematite" is intended to refer to specular hematite extracted from the deposit at Lac Jeannine, Quebec, Canada, and specular hematite having substantially the same physical and mechanical properties.

The above-described examples are meant to be merely exemplary, and those skilled in the art will be able to make numerous variations and modifications of them without departing from the spirit and scope of the invention. All such variations and modifications are intended to be included within the scope of the invention as defined in the appended claims.

I claim:

1. A heavy concrete composition for coating a pipe which is to be submerged in a fluid, the heavy concrete constituting ballast and reducing the buoyancy of the pipe and being coated onto the pipe by impacting a stream of concrete slurry against the pipe while maintaining relative movement between the pipe and the stream, consisting essentially of Portland cement and as an aggregate specular hematite, the ratio of cement to aggregate being in the range of by weight from about 1:3 to about 1:4 having a size distribution in which, by weight, at least 90% passes a #8 mesh screen and not more than 10% passes a #100 mesh screen, and being substantially free of microfines passing a #200 mesh screen.

2. A composition according to claim 1 in which the size distribution of the specular hematite is within the following ranges, by weight:

| Screen size: | Cumulative percent retained |
| --- | --- |
| #8 | <10.0. |
| #14 | 10 to 15. |
| #20 | 20 to 30. |
| #28 | 35 to 50. |
| #35 | 55 to 65. |
| #48 | 70 to 80. |
| #65 | 80 to 98. |
| #100 | 90 to 100. |

3. In a method of coating a pipe with a heavy concrete composition constituting ballast and reducing the buoyancy of the pipe when submerged in a fluid, the step of depositing on the pipe a slurry consisting essentially of Portland cement, water and a heavy aggregate, the ratio of cement to aggregate being in the range of by weight from about 1:3 to about 1:4 the heavy aggregate consisting essentially of specular hematite having a size distribution in which, by weight, at least 90% passes a #8 mesh screen and not more than 10% passes a #100 mesh screen, and being substantially free of microfines passing a #200 mesh screen.

4. A method according to claim 3 wherein the slurry is deposited on the pipe by moving the pipe surface past a continuous stream of the slurry, the pipe surface being moved through the stream at a rate established relative to the rate of the slurry stream to deposit the slurry on the pipe to the desired thickness, the slurry being impacted onto the surface of the pipe and sticking thereto.

5. A method according to claim 3 wherein the slurry is deposited on the pipe by rotating it and simultaneously moving it through a stream of the slurry, the rate of movement and rotation being established to deposit the slurry on the pipe to the desired thickness in the form of a helical band of the slurry on the pipe surface, the slurry being impacted onto the surface of the pipe and sticking thereto.

6. A method according to claim 3 wherein the size distribution of the specular hematite is, by weight, substantially as follows:

| Screen size: | Cumulative percent retained |
| --- | --- |
| #8 | <10.0. |
| #14 | 10 to 15. |
| #20 | 20 to 30. |
| #28 | 35 to 50. |
| #35 | 55 to 65. |
| #48 | 70 to 80. |
| #65 | 80 to 98. |
| #100 | 90 to 100. |

7. A method according to claim 4 wherein the pipe has a plastic coating.

References Cited

UNITED STATES PATENTS

| | | | |
| --- | --- | --- | --- |
| 1,183,255 | 5/1906 | Van der Toorn | 106—97 |
| 1,914,897 | 6/1933 | Schade | 138—146 |
| 2,279,262 | 4/1942 | Edwards | 106—97 |
| 2,409,094 | 10/1946 | Ahles | 106—97 |
| 2,625,905 | 1/1953 | Richards | 118—312 |
| 2,669,436 | 2/1954 | Smith | 118—320 |
| 2,700,622 | 1/1955 | Burwell | 117—75 |
| 2,764,218 | 9/1956 | Richards | 118—320 |
| 2,963,045 | 12/1960 | Canevari et al. | 138—146 |
| 2,987,406 | 6/1961 | Minnick | 106—97 |
| 2,992,131 | 7/1961 | Bricknell | 117—75 |

FOREIGN PATENTS 3,127 7/1882 Great Britain.

OTHER REFERENCES

Lea and Desch, The Chemistry of Cement and Concrete, Edward Arnold Ltd., London, 1956, 2nd ed., p. 510 (1956).

Taylor, Concrete Technology and Practice, American Elsevier Pub., Co., New York, 1965, pp. 43, 50, 53, 67, 417–420.

TOBIAS E. LEVOW, *Primary Examiner.*

S. E. MOTT, *Assistant Examiner.*